United States Patent
Tai et al.

(10) Patent No.: US 11,068,422 B1
(45) Date of Patent: Jul. 20, 2021

(54) SOFTWARE-CONTROLLED INTERRUPTS FOR I/O DEVICES

(71) Applicant: VMware, Inc., Palo Alto, CA (US)

(72) Inventors: Amy Tai, Tulsa, OK (US); Igor Smolyar, Palo Alto, CA (US); Dan Tsafrir, Haifa (IL); Michael Wei, Palo Alto, CA (US); Nadav Amit, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/804,480

(22) Filed: Feb. 28, 2020

(51) Int. Cl.
 *G06F 13/24* (2006.01)
 *G06F 3/06* (2006.01)
 *G06F 13/10* (2006.01)

(52) U.S. Cl.
 CPC .......... *G06F 13/24* (2013.01); *G06F 13/102* (2013.01); *G06F 3/061* (2013.01); *G06F 3/0659* (2013.01)

(58) Field of Classification Search
 CPC ..................................................... G06F 13/24
 See application file for complete search history.

(56) References Cited

U.S. PATENT DOCUMENTS

| | | | | |
|---|---|---|---|---|
| 8,554,968 B1* | 10/2013 | Onufryk | ................ | G06F 13/24 710/260 |
| 10,102,162 B2* | 10/2018 | Lee | .................. | G06F 1/206 |
| 10,657,084 B1* | 5/2020 | Thyamagondlu | ....... | G06F 13/28 |
| 2008/0091868 A1* | 4/2008 | Mizrachi | ................ | G06F 13/24 710/263 |
| 2008/0155154 A1* | 6/2008 | Kenan | ................... | G06F 9/4812 710/263 |
| 2014/0331001 A1* | 11/2014 | Liu | ...................... | G06F 3/0659 711/103 |
| 2018/0275872 A1* | 9/2018 | Benisty | ................ | G06F 3/0679 |
| 2020/0065264 A1* | 2/2020 | Gissin | ................... | G06F 3/0659 |
| 2020/0117623 A1* | 4/2020 | Han | ...................... | G06F 3/0673 |

OTHER PUBLICATIONS

VMWare—"Improving Performance with Interrupt Coalescing for Virtual Machine Disk IO in VMware ESX Server"; 9 Pages, Dated Jan. 2009 (Year: 2009).*

* cited by examiner

*Primary Examiner* — Brian T Misiura
(74) *Attorney, Agent, or Firm* — Patterson + Sheridan, LLP (57) ABSTRACT

Described herein are embodiments that adaptively reduce the number of interrupts that occur between a device controller and a computer system. Device commands are submitted to the controller by an operating system on behalf of an application. The device performs the received commands and indicates command completions to the controller. A counter counts completions, and if the count exceeds a threshold number, the controller generates an interrupt to the computer system. If the count is greater than zero and the timeout interval has expired, then the controller generates an interrupt to the computer system. In some embodiments, the application attaches flags to one of the commands indicating that an interrupt relating to completion of the flagged command should be generated as soon as possible or that an interrupt relating to completion of all commands prior to and including the flagged command should be generated as soon as possible.

20 Claims, 9 Drawing Sheets

SOFTWARE-CONTROLLED INTERRUPTS FOR I/O DEVICES

BACKGROUND

Memory devices such as solid-state memory devices and other low-latency storage devices can now generate millions of I/O operations per second (IOPS), which means one interrupt per I/O command is no longer a viable way for operating system software to interact with such a device. Alternatives to an interrupt per I/O command include polling and interrupt coalescing. Polling, however, wastes CPU resources and requires making guesses regarding time intervals between polling. Interrupt coalescing, which uses a fixed, arbitrary batch size and a fixed timeout, performs poorly because the timeout is too long compared to the native latency of the devices, and fixed batch sizes have no relation to a workload that generates the commands to the device. Thus, key metrics, such as latency in servicing a command and throughput in terms of the number of operations per second, suffer. It is desirable to improve the handling of interrupts from these devices in a way that does not impede the performance these devices can offer.

DETAILED DESCRIPTION

Embodiments described herein provide for reducing the number of interrupts to the host computer system when operating a storage device, such as a low-latency storage device that is capable of millions of operations per second. Commands to the storage device by the operating system on behalf of an application are stored in a submission queue sQ and completions of those commands are stored in a completion queue cQ. However, the computer system is not informed of the completions until it receives an interrupt from a controller controlling the storage device. The interrupt from the controller is generated to the host computer system after a threshold number of completions within a time interval. In some embodiments, the threshold number and the time interval are set by the application so that generation of the interrupts can be tailored to the type of workload type presented by the application. Tailoring assures that an application does not experience excessive latency for time-sensitive operations while still receiving a single interrupt for a large number of completions.

Figure 1A:
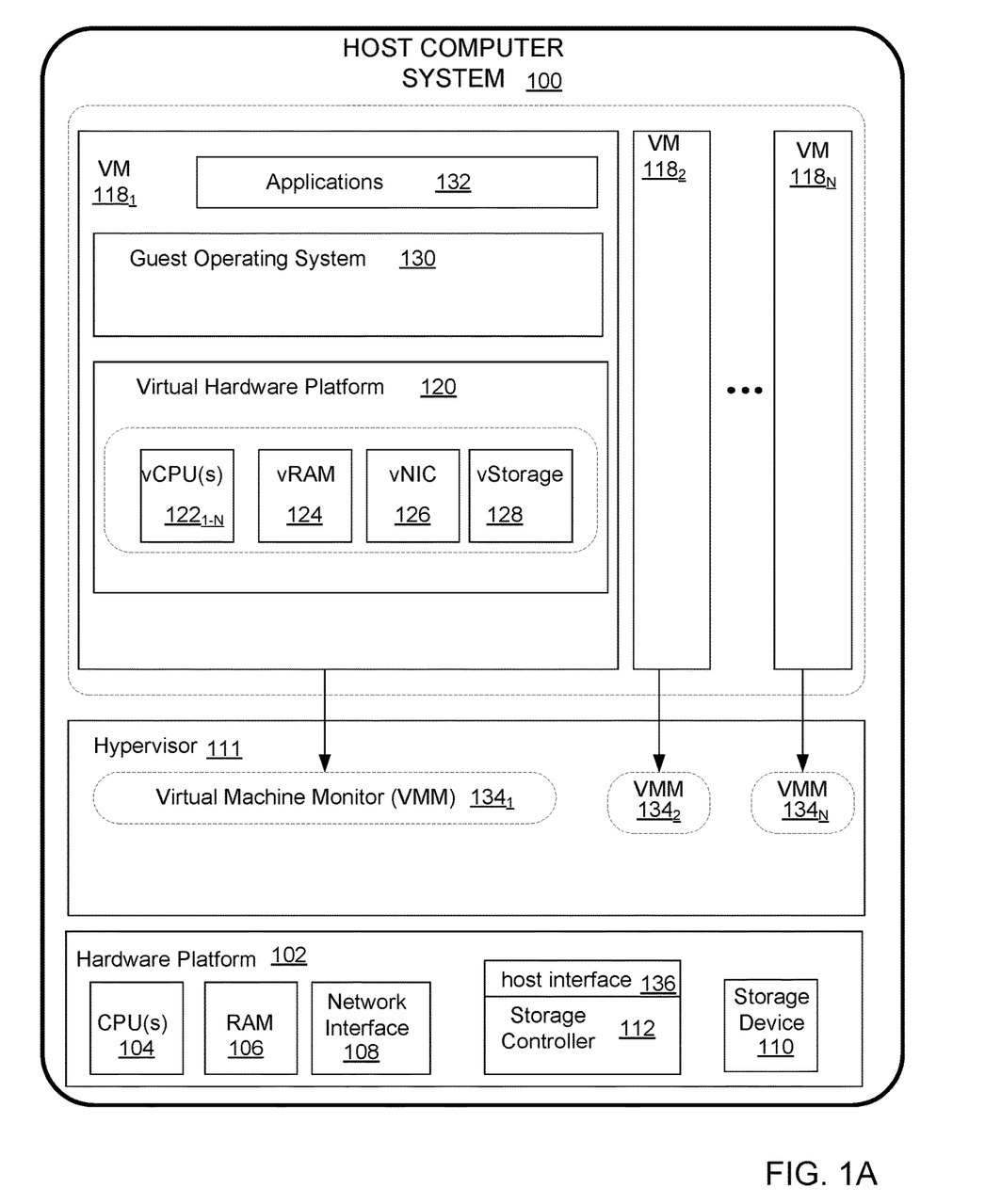
FIG. 1A depicts an example host system in which embodiments may run.

FIG. 1A depicts a block diagram of a computer system 100 that is representative of a virtualized computer architecture. As is illustrated, host computer system 100 supports multiple virtual machines (VMs) 118₁-118N, which are an example of virtual computing instances that run on and share a common hardware platform 102. Hardware platform 102 includes conventional computer hardware components, such as random access memory (RAM) 106, one or more network interfaces 108, storage controller 112 with host interface 136, persistent storage device 110, and one or more central processing units (CPUs) 104. Central processing units 104 may include processing units having multiple cores.

A virtualization software layer, hereinafter referred to as a hypervisor 111, is installed on top of hardware platform 102. Hypervisor 111 makes possible the concurrent instantiation and execution of one or more VMs 118₁-118N. The interaction of a VM 118 with hypervisor 111 is facilitated by the virtual machine monitors (VMMs) 134₁-134N. Each VMM 134₁-134N is assigned to and monitors a corresponding VM 118₁-118N. In one embodiment, hypervisor 111 may be a VMkernel™ which is implemented as a commercial product in VMware's vSphere® virtualization product, available from VMware™ Inc. of Palo Alto, Calif. In an alternative embodiment, hypervisor 111 runs on top of a host operating system, which itself runs on hardware platform 102. In such an embodiment, hypervisor 111 operates above an abstraction level provided by the host operating system.

After instantiation, each VM 118₁-118N encapsulates a virtual hardware platform 120 that is executed under the control of hypervisor 111. Virtual hardware platform 120 of VM 118₁, for example, includes but is not limited to such virtual devices as one or more virtual CPUs (vCPUs) 122₁-122N, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of guest OS 130 include any of the well-known operating systems, such as the Microsoft Windows™ operating system, the Linux™ operating system, and the like.

Figure 1B:
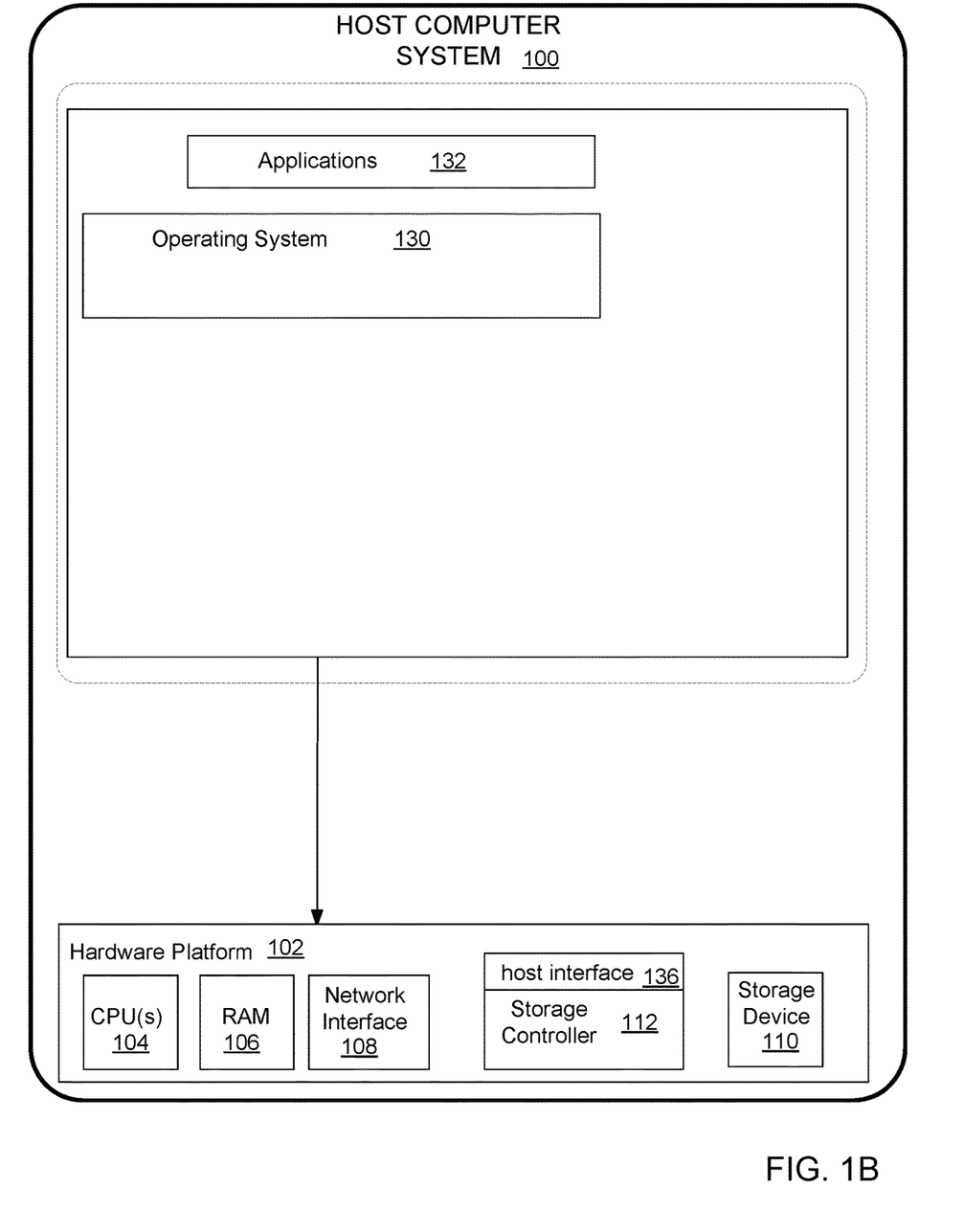
FIG. 1B depicts a block diagram of a computer system that is representative of a non-virtualized computer architecture.

FIG. 1B depicts a block diagram of a computer system 100 that is representative of a non-virtualized computer architecture. Host computer system 100 includes hardware platform 102 and operating system 130 running on hardware platform 102. Operating system 130 executes applications 132. Examples of OS 130 include any of the well-known operating systems, such as the Microsoft Windows™ operating system, the Linux™ operating system, and the like.

Figure 1C:
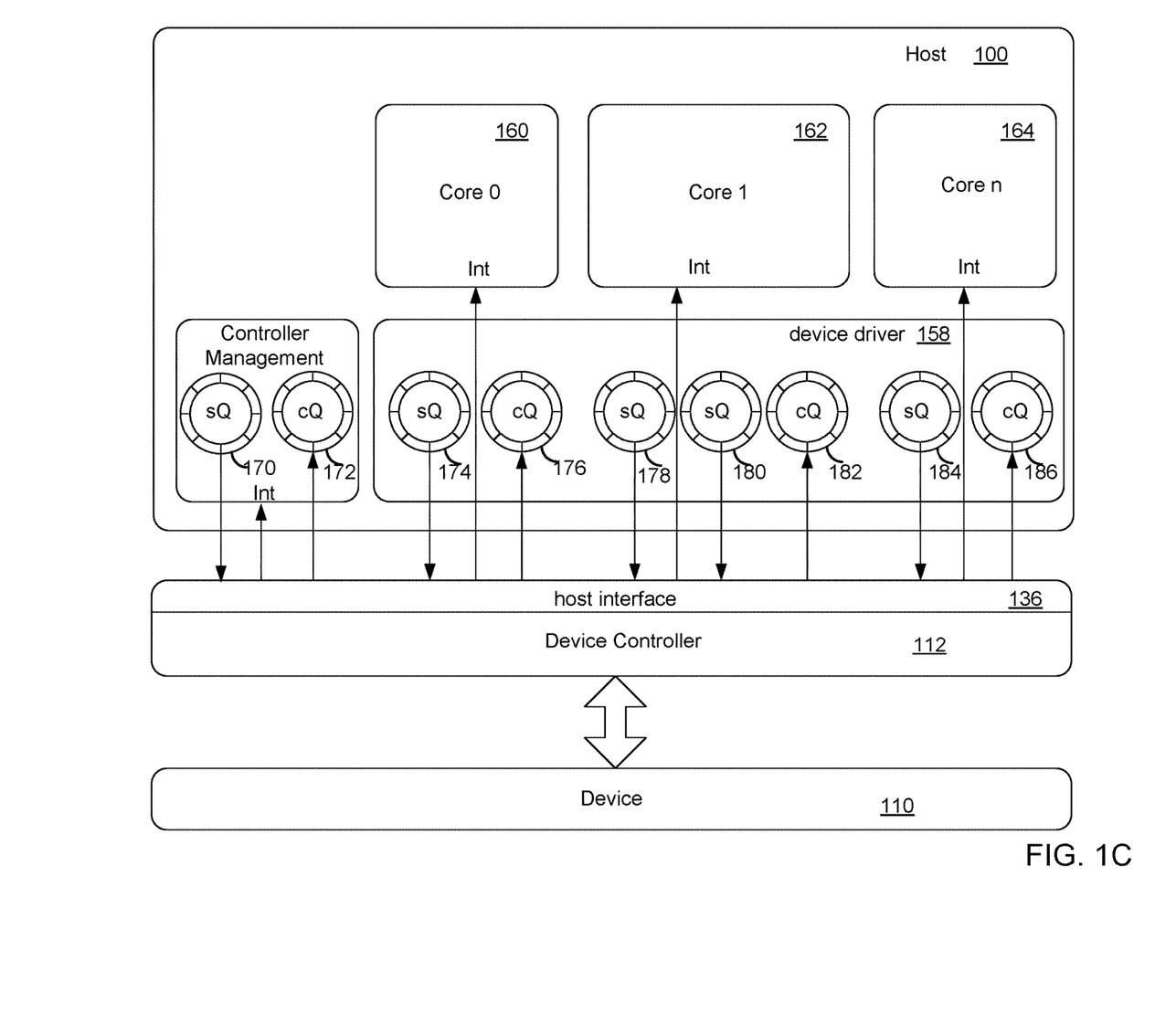
FIG. 1C depicts a more detailed block diagram of a device controller for coupling a host computer system to a device, in an embodiment.

FIG. 1C depicts a more detailed block diagram of a device controller for coupling a host computer system to a device, in an embodiment. The device controller 112 operates the device 110 and includes a host interface 136. In one embodiment, the host interface 136 conforms to the NVM Express® interface standard, and device 110 is a solid-state storage device. The NVM Express® standard specifies a protocol that supports up to 64,000 queues, each of which can have up to 64,000 commands. These queues are designed such that I/O commands and responses to those commands have affinity to one of the processor cores and can take advantage of the parallel processing capabilities of multi-core processors. Each application or thread can have its own independent queue so that no I/O locking is needed.

An example embodiment of such a device controller 112 is depicted in FIG. 1C. In the example embodiment, the host interface 136 couples to a submission queue sQ 170 and a completion queue cQ 172 for managing communication between the host computer system 100 and the device controller 112 and for each processor core 160, 162, 164, one or more submission queues sQs 174, 178, 180, 184 and a completion queue cQ 176, 182, 186. The management submission queue sQ 170 and completion queue cQ 172 are used for the commands that are part of an Admin Command Set. Such commands include creating and deleting an I/O submission queue sQ, creating and deleting an I/O completion queue cQ, doorbell buffer configuration, abort, and other operations. The I/O submission queues sQs 174, 178, 180, 184 receive commands to perform a device operation. Commands include entries indicating locations in physical memory to use for data transfers. The I/O completion queues cQs 176, 182, 186 receive completion entries that provide status for a completed command, such as successful completion or error. The completed command is uniquely identified by a combination of the associated submission queue sQ identifier and a command identifier provided by the operating system. The entry also includes a phase tag bit that indicates whether an entry has been newly posted.

Figure 2:
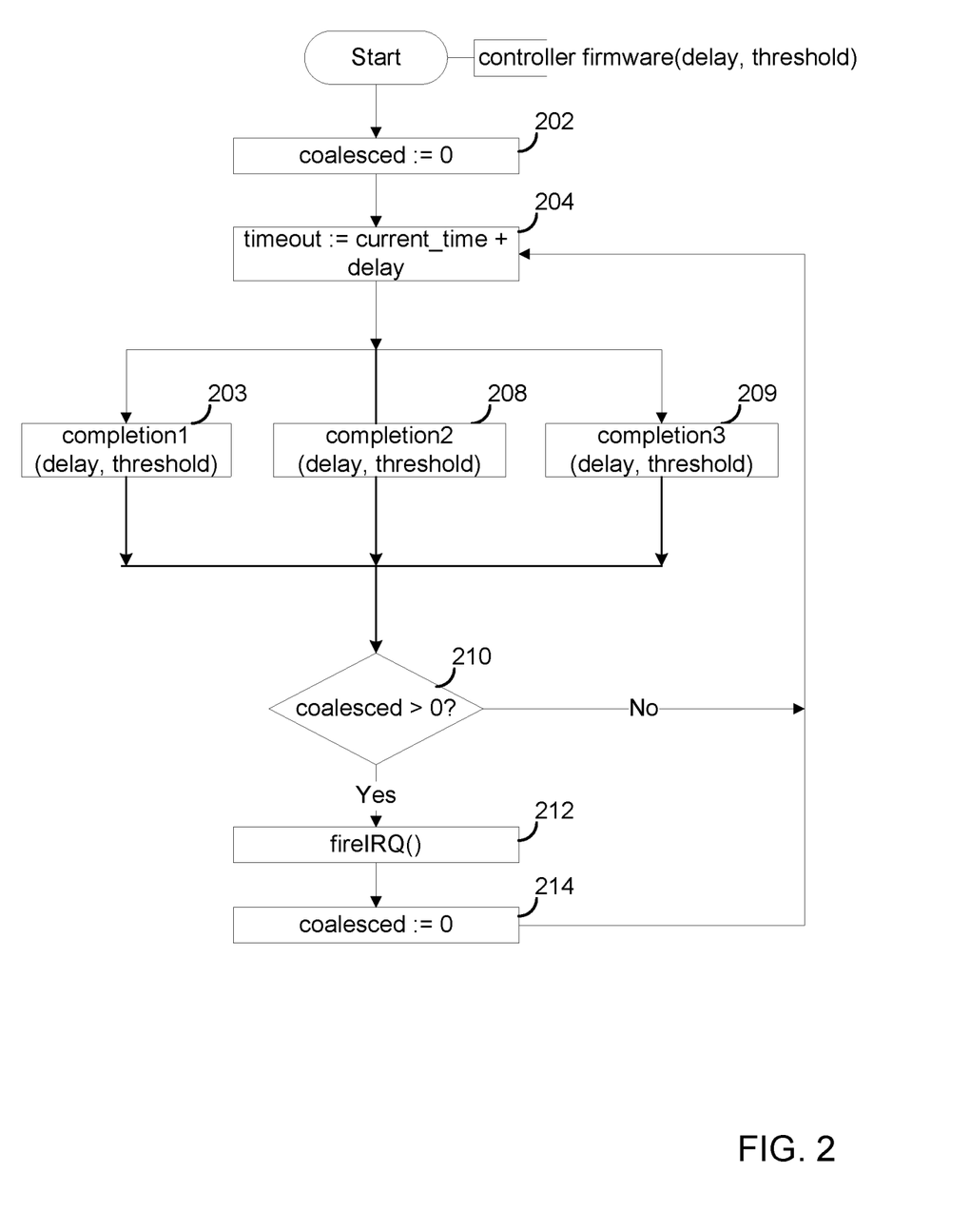
FIG. 2 depicts a flow of operations for the device controller depicted in FIG. 1C, in an embodiment.

FIG. 2 depicts a flow of operations for the device controller 112 depicted in FIG. 1C. In step 202, the device controller 112 initializes the variable, coalesced, to zero. The variable coalesced is a counter that counts the number of completions by the device 110 being controlled. For example, if the device 110 is a memory device and read commands are submitted, then for each completion of the read, the variable is incremented. In step 204, the timeout interval is initialized. The timeout interval is initialized to equal the current time variable, current_time, plus a delay. Thus, when initialized, the timeout interval=current_time+ delay. As time advances, then the value of current_time increases, and eventually, the value of current_time exceeds the timeout interval, unless timeout is modified. Controller 112 calls the completion1 function in step 203 or the completion2 function in step 208, or the completion3 function in step 209. The completion2 function is an enhanced version of the completion1 function in that the completion2 function can take hints from the application or operating system to determine the generation of the interrupt, while completion1 function cannot. The completion3 function alters the time at which a hint from the application or operating system is acted on. In certain aspects, the device controller 112/device 110 is configured with only one of completion1 function or completion2 function or completion3 function, such that device controller 112/device 110 does not select between the completion1 function or the completion2 or the completion3, but rather utilizes the configured function. The completion functions 203, 208, and 209 may cause the firing of an interrupt and are further described in reference to FIGS. 3 and 4A-C, respectively. Upon return from either the completion1 function or the completion2 function or the completion3 function, the value of coalesced is tested in step 210. If, as determined in step 210, the value of coalesced is greater than zero, the controller 112 calls the fireIRQ function, which generates an interrupt to the operating system or hypervisor of the host computer system in step 212, and clears the coalesced value to zero in step 214. After calling the fireIRQ function or if the value of the coalesced variable is not greater than 0, the controller then returns to step 204, to re-initialize the timeout interval and carry out steps 204-214 according to the flow depicted.

Thus, the controller calls either completion1 or completion2 or completion3 to fire an interrupt when a sufficient number of completions has occurred or if an application or operating system hint is encountered. When either function returns, the coalesced counter is checked to determine if the counter is non-zero. If so, then a fireIRQ function is performed, and the counter is reset.

In another embodiment, instead of the controller performing the flow of operations of FIG. 2, the operating system performs the flow of operations. In this embodiment, interrupts between the controller and the operating system are turned off, and the operating system polls the controller for the state of the completion queue cQ before delivering an interprocessor interrupt (IPI) to the core whose completion queue cQ was polled.

Figure 3:
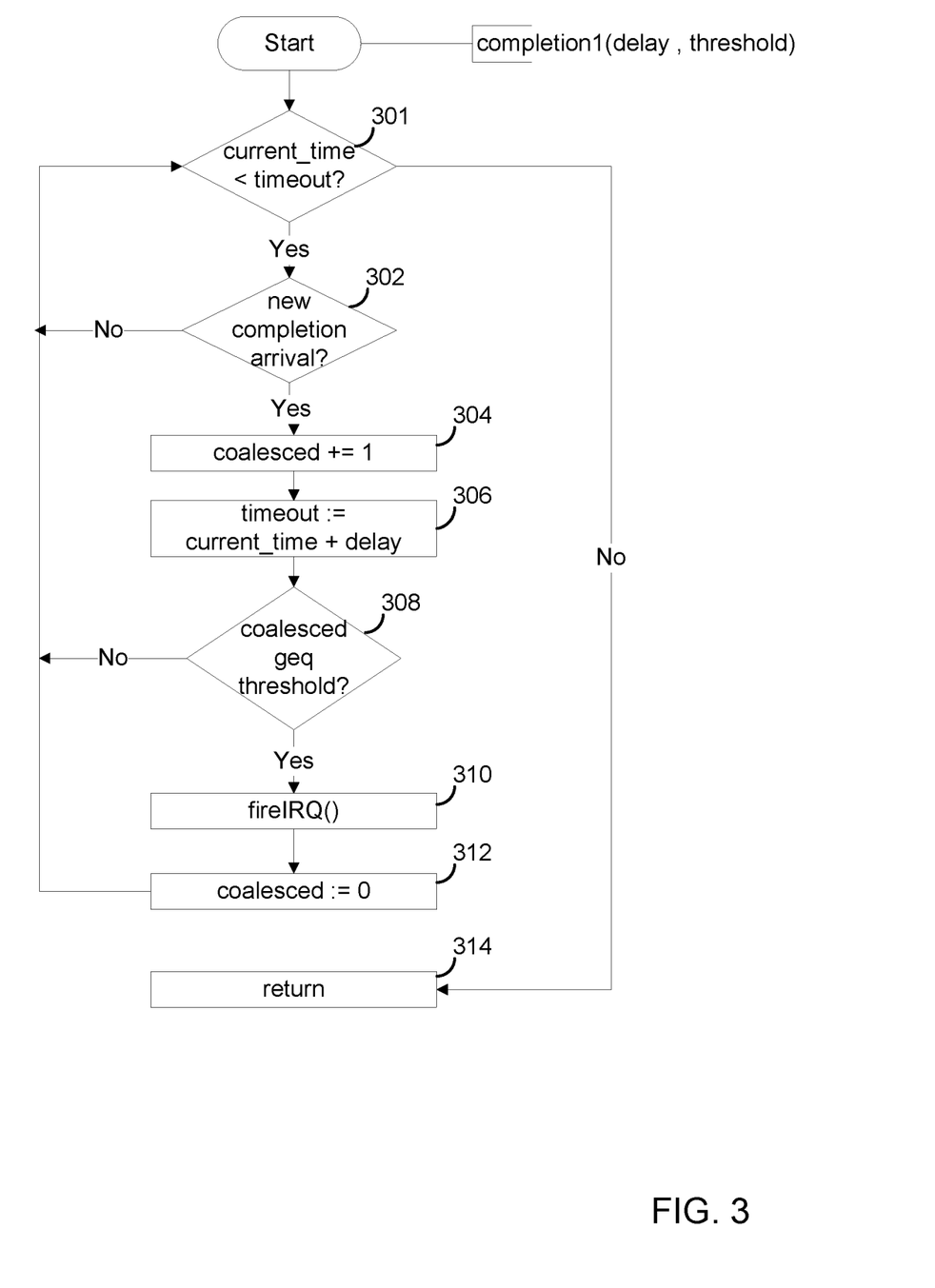
FIG. 3 depicts a flow of operations for an embodiment of a completion function.

FIG. 3 depicts a flow of operations for a completion function, in an embodiment. As mentioned above, the completion function is called in step 203 of FIG. 2. In step 301, the function, completion1, tests current_time against timeout. If current_time is less than timeout, then in step 302, the function tests for a new completion of the currently commanded operation of the device 110. The controller 112 determines that a new completion has occurred based on the protocol used to operate the device 110. For example, if the device 110 is a solid-state memory device conforming to the NVMe protocol, then a completion is signaled by a new entry in the completion queue cQ. In step 304, if a completion has occurred, the function increments the value of coalesced, which is the counter for the number of completions. In step 306, the function increases the timeout interval by adding another time delay because a completion occurred. In step 308, the function tests the coalesced value against a given threshold, where the threshold is a given burst size parameter. If the coalesced value exceeds the threshold, then the function performs fireIRQ, which generates an interrupt to the operating system or hypervisor of the host computer system in step 310, clears the coalesced variable in step 312 and goes back to step 301 to look for another completion during the timeout interval. If coalesced does not exceed the threshold, the function goes back to step 302 to check for another completion during the timeout interval. If current_time equals or exceeds timeout as determined by step 301 (which occurs because there is no new completion during the timeout interval), then the function goes to step 314, which causes the flow to return to step 210 in FIG. 2.

Thus, if new completions occur during a timeout interval, they are collected until a threshold is reached, at which point the interrupt is fired. This gives one interrupt for the threshold number of completions and thus reduces the number of interrupts generated to the host computer system.

To obtain good throughput and low latency, in an embodiment, for a pure, single-threaded workload, the threshold is set to 32 completions, and the delay is set to 15 microseconds. For a mixed workload with one thread submitting synchronous reads and one thread submitting asynchronous reads, the delay, in an embodiment, is set at 6 microseconds, and the threshold is in the range of 20 to 40 completions. For a dynamic workload that switches from a synchronous workload to an asynchronous workload, in an embodiment, the delay is set to 15 microseconds, and the threshold is set to 32 completions. For a bursty workload in which an application submits commands in a bursty manner, in an embodiment, the delay is set to 15 microseconds, and the threshold is set to 32 completions. The above settings are examples of effective settings for the stated workloads, but other settings may be chosen depending on characteristics of the workload.

Figure 4A:
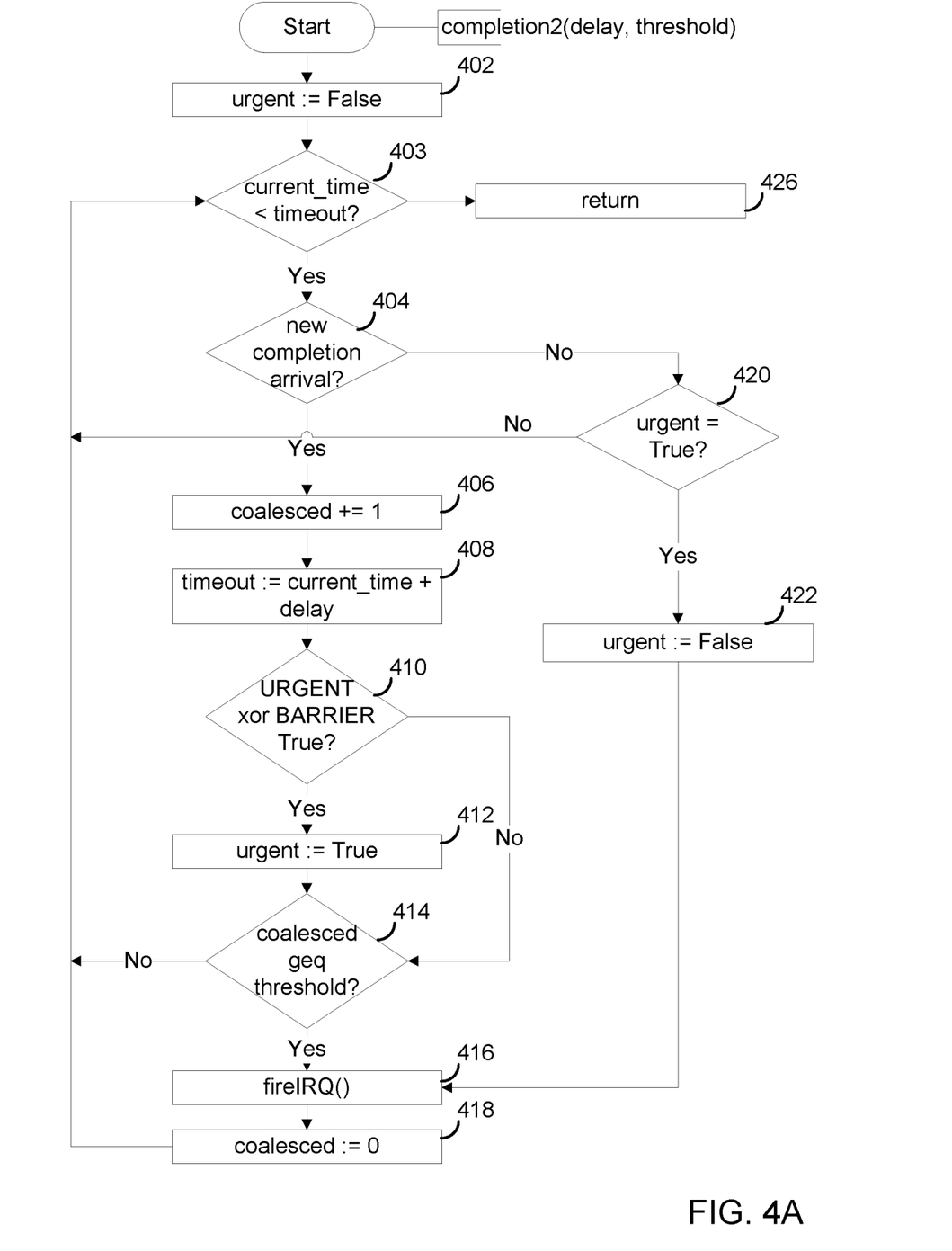
FIG. 4A depicts a flow of operations for another embodiment of a completion function.

FIG. 4A depicts a flow of operations for a modified completion function, in an embodiment. In this embodiment, two flags, URGENT and BARRIER, are used by software, such as application 132 or operating system 130, using the device 110 to provide hints to the device controller 112 so that the generation of interrupts can be adapted to the workload of the application 132. The URGENT flag, when set alone, indicates that the application 132 or operating system 130 is requesting an immediate interrupt from the device 110 after the operation completes. This flag may be used for latency-sensitive commands, which from the application's or operating system's perspective involve any blocking system calls such as READ or WRITE. The URGENT flag is included in an entry placed in the submission queue sQ for the application 132 and is carried over by the controller 112 to the corresponding completion entry in the completion queue cQ.

The BARRIER flag, when set alone, indicates that application 132 or operating system 130 is requesting that the device 110 generate an interrupt when all commands prior to and including the current command, which was submitted to the submission queue sQ with the BARRIER flag set, are completed. This flag is typically used for throughput-sensitive commands, such as batched-oriented 'libaio' READ or WRITE, where libaio provides the Linux-native API for async I/O. The BARRIER flag is used because the commands in the submission queue sQ need not be executed in the order that they have in the queue and thus guarantees that all of the commands up to and including the command with the BARRIER flag are completed and processed before other commands in the completion queue.

If neither flag is set, then the application 132 provides no hint for receiving interrupts. This leaves operating system 130 or in some embodiments, hypervisor 111 free to insert the flags according to the policy of either operating system 130 or hypervisor 111, respectively.

If both flags are set, then the application 132 is making an explicit request not to attach an URGENT or BARRIER flag to the command, thereby defaulting to the completion1 function depicted in FIG. 3.

Still referring to FIG. 4A, in step 402, a variable named urgent is initialized to False. The urgent variable indicates whether either the URGENT flag or the BARRIER flag was encountered in one of the completions. In step 403, the function, completion2, determines whether current_time is less than timeout. If so, then in step 404, the function determines whether a new completion has occurred (during the timeout). If a new completion has occurred, then in step 406, the function increments the coalesced counter and adds a delay the current_time in step 408. In step 410, the flags, URGENT and BARRIER associated with the completion, are tested. If either flag but not both is true, then the urgent variable is set True in step 412. In step 414, the value of coalesced is tested against the threshold. If, as determined in step 414, coalesced is greater than or equal to the threshold, then in step 416, the function performs fireIRQ, and in step 418 sets the coalesced counter back to zero. The function then returns to step 403.

If at step 404, if no new completion as occurred, then if urgent is True, as determined in step 420, urgent is set to False in step 422, and fireIRQ is performed in step 416, after which the counter coalesced is cleared in step 418. In fireIRQ, if urgent was set because only the URGENT flag was encountered in one of the completions, then the interrupt is generated for the completion with the URGENT flag. If urgent was set because only the BARRIER flag was encountered in one of the completions, then fireIRQ generates the interrupt when all commands prior to and including the completion with the BARRIER flag are completed.

Thus, the completion2 function waits until a burst has ended before testing and acting on the urgent variable. Acting on the urgent variable after the burst has ended prevents unnecessary interrupts that could result in an interrupt storm. If current_time is equal to or greater than timeout, then the function returns in step 426 back to step 208 of FIG. 2.

Figure 4B:
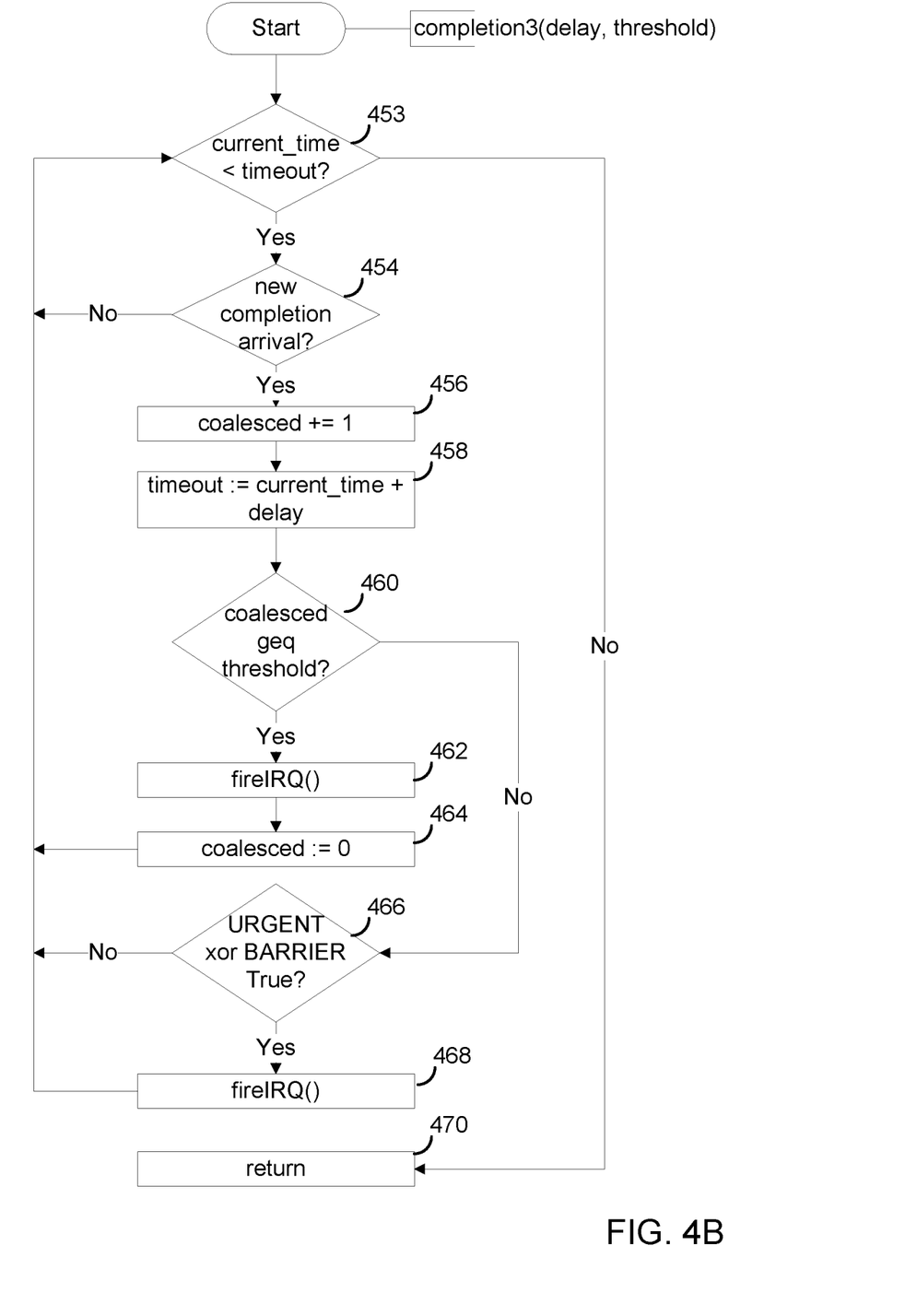
FIG. 4B depicts a flow of operations for yet another embodiment of a completion function.

FIG. 4B depicts a flow of operations for yet another completion function. In this embodiment, two flags, URGENT and BARRIER, are used as described above by software, such as application 132 or operating system 130 using device 110, to provide hints to the device controller 112 so that the generation of interrupts can be adapted to the workload of the application 132. In step 453, the function, completion3, determines whether current_time is less than timeout. If so, then in step 454, the function determines whether a new completion has occurred. If a new completion has occurred during the timeout, then the function increments the coalesced counter in step 456 and, in step 458, adds a new delay to current_time, which assures that the 'Yes' branch of step 453 will occur when step 453 is next executed. In step 460, the function determines whether the coalesced counter is equal to or greater than the threshold. If so, then the function performs fireIRQ, which generates an interrupt to the operating system or hypervisor of the host computer system in step 462, and sets the coalesced counter to zero in step 464.

Still referring to FIG. 4B, if in step 460, the function determines that the coalesced counter does not exceed the threshold, then in step 466, the function tests whether either the URGENT or BARRIER flag but not both was encountered in the current completion. If so, then the function performs fireIRQ in step 468, which generates an interrupt to the operating system or hypervisor of the host computer system immediately, i.e., instead of waiting until a burst has ended. In fireIRQ, if only the URGENT flag was encountered in one of the completions, then the interrupt is generated for the completion with the URGENT flag. If only the BARRIER flag was encountered in one of the completions, then fireIRQ generates the interrupt when all commands prior to and including the completion with the BARRIER flag are completed.

If fireIRQ occurs, either because the threshold was met or the URGENT or BARRIER flag was set, the function returns to step 453. In step 453, if current_time equals or exceeds timeout, then the function returns in step 470 to step 210 in FIG. 2.

Figure 5:
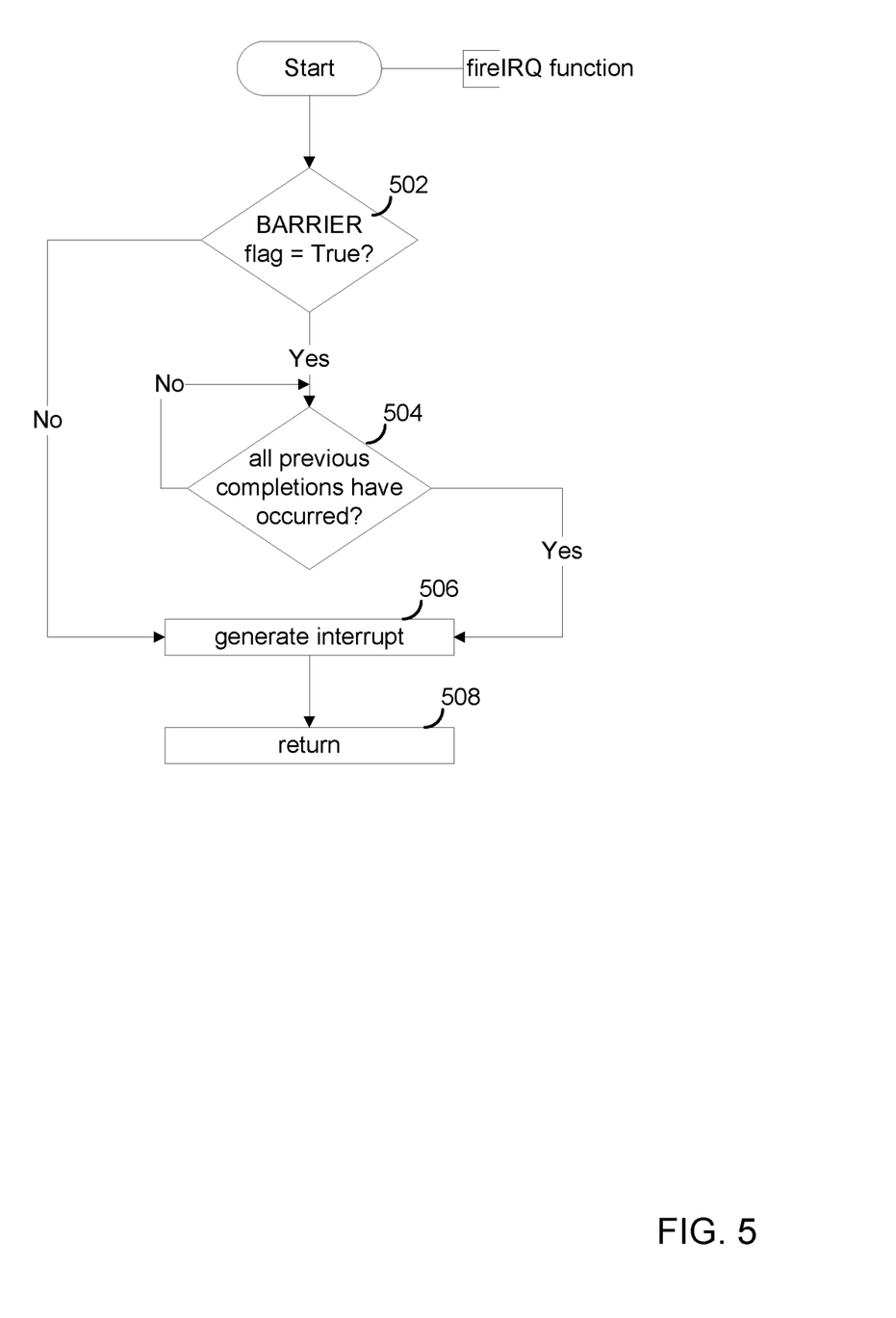
FIG. 5 depicts a flow of operations for the fireIRQ function, in an embodiment.

FIG. 5 depicts a flow of operations for the fireIRQ function, in an embodiment. In step 502, the function determines whether the BARRIER flag is true in a completion. If so, the function waits in step 504 for all completions prior to the completion having the BARRIER flag. When all such completions have occurred, the function generates the interrupt in step 506. If, as determined in step 502, the BARRIER flag is not set, then the function generates the interrupt in step 506 immediately. In step 508, the function returns.

Figure 6:
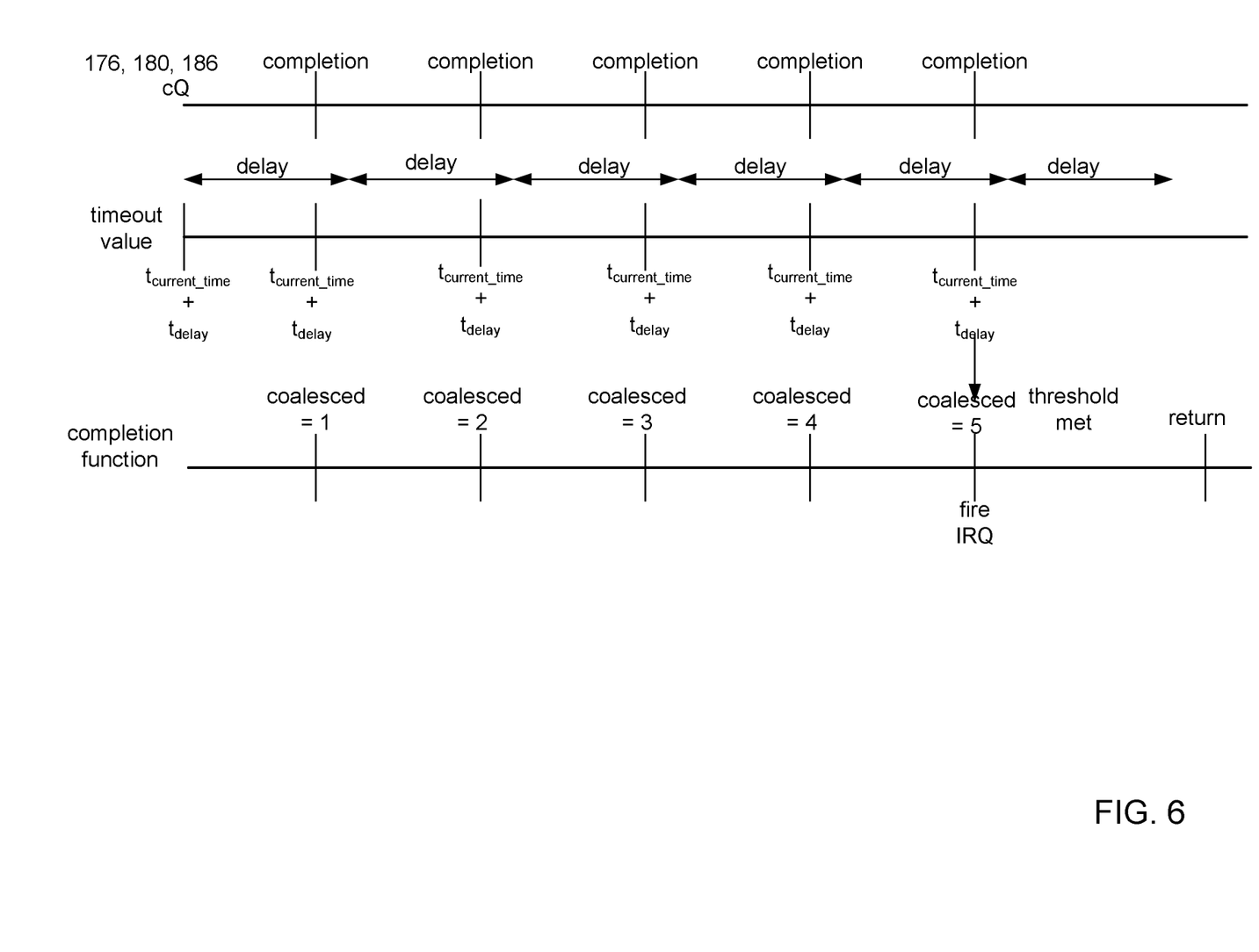
FIG. 6 depicts timelines illustrating activity in a completion queue, of a timeout variable and the completion function, in an embodiment.

FIG. 6 depicts a number of timelines of a typical case. The first timeline shows completions at the completion queue cQ 176, 182, 186. The second timeline shows the changes to the timeout variable. The third timeline shows the changes to the coalesced variable in the completion functions, where, at each completion, timeout is re-initialized to equal current_time+delay. Re-initializing the timeout value gives up to a full delay time for another completion to occur. According to the figure, after five completions, the threshold number of completions is met, and fireIRQ is performed, after which the completion function returns.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for reducing interrupts between a device controller and a host computer system, the method comprising:

receiving a plurality of commands for device operations;

determining a threshold number of command completions based on a workload type wherein the workload generates the plurality of commands for the device operations;

determining a delay time based on the workload type wherein the workload generates the plurality of commands for the device operations;

during a timeout interval, for each command completion:

incrementing a count and adding the determined delay time to the timeout interval; and
  if, after the command completion, the count exceeds the determined threshold number of command completions, generating an interrupt to the host computer system; and
at the end of the timeout interval, if the count is greater than zero, generating an interrupt to the host computer system.

2. The method of claim 1,
wherein an urgent flag when true indicates that an application requests that one of the commands for device operations is urgent; and
further comprising, when the count is greater than zero and no new command completions occur during the timeout interval, generating the interrupt to the host computer system if the urgent flag is found true.

3. The method of claim 2,
wherein a barrier flag when true indicates that an application requests that one of the commands for device operations requires that the one command and all commands received prior to the one command cause an interrupt to the host computer system; and
further comprising, when the count is greater than zero and no new command completions occur during the timeout interval, generating the interrupt to the host computer system if the barrier flag is found true during the timeout interval.

4. The method of claim 3, wherein the barrier flag and the urgent flag, when both false, indicate that the application is requesting that an operating system determine whether to set either or both flags.

5. The method of claim 1,
wherein an application running on the host computer issues commands for device operations; and
wherein the timeout interval is provided by the application.

6. The method of claim 1,
wherein an application running on the host computer issues commands for device operations; and
wherein the threshold is provided by the application.

7. The method of claim 1, wherein determining the threshold number of command completions and the delay time comprises:
  if, the workload type is a single threaded workload, determining a first value for the threshold number of command completions and a second value for the delay time;
  if, the workload type is a mixed workload, determining a third value for the threshold number of command completions and a fourth value for the delay time;
  if, the workload type is a dynamic workload, determining a fifth value for the threshold number of command completions and a sixth value for the delay time; and
  if, the workload type is a bursty workload, determining a seventh value for the threshold number of command completions and an eighth value for the delay time.

8. A non-transitory computer-readable medium comprising instructions executable in a computer system, wherein the instructions when executed in the computer system cause the computer system to carry out a method for reducing interrupts between a device controller and a host computer system, the method comprising:
  receiving a plurality of commands for device operations;
  determining a threshold number of command completions based on a workload type wherein the workload generates the plurality of commands for the device operations;
  determining a delay time based on the workload type wherein the workload generates the plurality of commands for the device operations;
  during a timeout interval, for each command completion:
    incrementing a count and adding the determined delay time to the timeout interval; and
    if, after the command completion, the count exceeds the determined threshold number of command completions, generating an interrupt to the host computer system; and
  at the end of the timeout interval, if the count is greater than zero, generating an interrupt to the host computer system.

9. The non-transitory computer-readable medium of claim 8,
wherein an urgent flag when true indicates that an application requests that one of the commands for device operations is urgent; and
further comprising, when the count is greater than zero and no new command completions occur during the timeout interval, generating the interrupt to the host computer system if the urgent flag is found true.

10. The non-transitory computer-readable medium of claim 9,
wherein a barrier flag when true indicates that an application requests that one of the commands for device operations requires that the one command and all commands received prior to the one command cause an interrupt to the host computer system; and
further comprising, when the count is greater than zero and no new command completions occur during the timeout interval,
generating the interrupt to the host computer system if the barrier flag is found true during the timeout interval.

11. The non-transitory computer-readable medium of claim 10, wherein a barrier flag and an urgent flag, when both false, indicate that the application is requesting that an operating system determine whether to set either or both flags.

12. The non-transitory computer-readable medium of claim 8,
wherein an application running on the host computer issues commands for device operations; and
wherein the timeout interval is provided by the application.

13. The non-transitory computer-readable medium of claim 8,
wherein an application running on the host computer issues commands for device operations; and
wherein the threshold is provided by the application.

14. The non-transitory computer-readable medium of claim 8, wherein determining the threshold number of command completions and the delay time comprises:
  if, the workload type is a single threaded workload, determining a first value for the threshold number of command completions and a second value for the delay time;
  if, the workload type is a mixed workload, determining a third value for the threshold number of command completions and a fourth value for the delay time;
  if, the workload type is a dynamic workload, determining a fifth value for the threshold number of command completions and a sixth value for the delay time; and if, the workload type is a bursty workload, determining a seventh value for the threshold number of command completions and an eighth value for the delay time.

15. A computer system comprising:
a memory;
a processor coupled to the memory, wherein the processor runs an operating system and an application loaded into the memory; and
a device controller for controlling a solid-state memory device, wherein the device controller is configured to:
receive a plurality of commands for device operations;
determine a threshold number of command completions based on a workload type wherein the workload generates the plurality of commands for the device operations;
determine a delay time based on the workload type wherein the workload generates the plurality of commands for the device operations;
during a timeout interval, for each command completion:
increment a count and add the determined delay time to the timeout interval; and
if, after the command completion, the count exceeds the determined threshold number of command completions, generate an interrupt to the host computer system; and
at the end of the timeout interval, if the count is greater than zero, generate an interrupt to the host computer system.

16. The computer system of claim 15,
wherein an urgent flag when true indicates that an application requests that one of the commands for device operations is urgent; and
wherein the device controller is further configured to, when the count is greater than zero and no new command completions occur during the timeout interval, generate the interrupt to the host computer system if the urgent flag is found true.

17. The computer system of claim 15,
wherein a barrier flag when true indicates that an application requests that one of the commands for device operations requires that the one command and all commands received prior to the one command cause an interrupt to the host computer system; and
wherein the device controller is further configured to, when the count is greater than zero and no new command completions occur during the timeout interval, generate the interrupt to the host computer system if the barrier flag is found true during the timeout interval.

18. The computer system of claim 15, wherein a barrier flag and an urgent flag, when both false, indicate that the application is requesting that the operating system determine whether to set either or both flags.

19. The computer system of claim 15,
wherein the application running on the host computer issues commands for device operations; and
wherein the time interval is provided by the application.

20. The computer system of claim 15, wherein determining the threshold number of command completions and the delay time comprises:
if, the workload type is a single threaded workload, determining a first value for the threshold number of command completions and a second value for the delay time;
if, the workload type is a mixed workload, determining a third value for the threshold number of command completions and a fourth value for the delay time;
if, the workload type is a dynamic workload, determining a fifth value for the threshold number of command completions and a sixth value for the delay time; and
if, the workload type is a bursty workload, determining a seventh value for the threshold number of command completions and an eighth value for the delay time.

* * * * *